July 9, 1940.   P. F. DANEL   2,207,479
AUTOMATIC GATE
Original Filed Dec. 15, 1936   2 Sheets-Sheet 1

INVENTOR
PIERRE FRANCOIS DANEL
BY Young, Emery & Thompson
ATTORNEYS

July 9, 1940.  P. F. DANEL  2,207,479
AUTOMATIC GATE
Original Filed Dec. 15, 1936  2 Sheets-Sheet 2

Inventor,
P. F. DANEL
By Young, Emery & Thompson
Attys.

Patented July 9, 1940

2,207,479

UNITED STATES PATENT OFFICE 2,207,479

AUTOMATIC GATE

Pierre François Danel, Grenoble, France

Original application December 15, 1936, Serial No. 116,024. Divided and this application December 20, 1937, Serial No. 180,870. In France January 4, 1936

9 Claims. (Cl. 61—25)

This application is a division of my co-pending application Serial No. 116,024, filed December 15, 1936, now Patent No. 2,160,959, granted June 6, 1939.

This invention relates to an automatic differential gate, in particular for irrigation installations. An object of this invention is to provide, in an open channel water system having a sudden drop in the level between upstream and downstream reaches, an automatic gate for maintaining the level of the upstream reach constant.

Another object of this invention is to provide, in an open channel water system having a sudden drop in the level between upstream and downstream reaches, an automatic gate for maintaining the level of the upstream reach constant and for preventing a reverse flow when the level of the downstream reach exceeds that of the upstream reach.

With these and other important objects in view, which may be incident to my improvements, the invention resides in the parts and combinations to be hereinafter set forth and claimed, with the understanding that the several necessary elements comprising my invention may be varied in construction, proportions and arrangement, without departing from the spirit and scope of the appended claims.

One form of the present invention embodies an oscillating automatic gate comprising a gate leaf in the form of a cylindrical sector, the axis of which is coincident with the axis about which the gate oscillates. The gate leaf is connected to its axis by a continuous platform subjected on one side to the pressure of the upstream level and on the other side to a constant pressure under normal conditions.

The gate leaf is immersed in the water and, by reason of the fact that it is in the form of a sector of a cylinder, the resultant of the hydraulic forces which are exerted on opposite sides thereof passes through the axis of oscillation and therefore does not give rise to any force tending to produce rotation about the axis to raise or lower the gate. The platform may be arranged to move between the side walls of the chamber or canal into which the gate is placed or at the discharge end of an orifice opening into a channel of large width.

It is important that the platform is located in a zone where the water has only a low velocity, or preferably a zero velocity, so that the pressures exerted thereon are hydrostatic or practically hydrostatic. This can be obtained by the gate leaf being arranged beneath the platform and/or from the use of baffles and the like, as will hereinafter appear.

In order to make the invention more clearly understood, there is shown in the accompanying drawings means for carrying the same into practical effect without limiting the improvements in their useful applications to the particular constructions which, for the purpose of explanation, have been made the subject of illustration.

Figure 1:
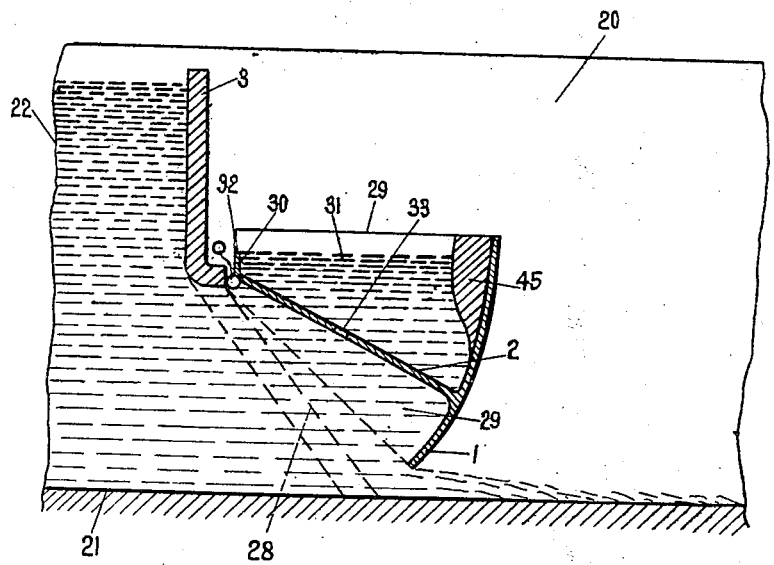
Figure 1 is a diagrammatic longitudinal vertical sectional view of a channel provided with an automatic gate for maintaining a constant level of the upstream reach of water in the channel.

According to the present invention as shown in Fig. 1, an open channel defined by side walls 20 and a bottom 21 is provided with a vertical wall or dam 3 extending across the same for separating the upstream reach 22 from the downstream reach 23.

The embodiment of the present invention as shown in Fig. 1 is applied to a system in which the channel of the upstream reach discharges into a downstream channel of much greater width. The discharge end of the upstream channel is provided with a vertical wall or dam 3 extending across the same. The lower portion of the dam 3 is inclined as shown in the drawings and is provided with a discharge opening 28, the width of which is less than that of the downstream channel. The opening 28 is variably covered by a closure member which comprises a substantially horizontal platform 2 connected to the dam 3 by means of a hinge 0. The platform 2 carries at its downstream end a gate leaf 1 which extends both downwardly and upwardly therefrom. This gate leaf is a sector of a cylinder, the axis of which is coincident with the axis of the hinge 0.

By constructing the gate leaf 1 as a sector of a cylinder, the resultant of all forces acting thereon is in a radial direction and does not have any components tending to produce rotation of the gate about the hinge 0 to lift or lower the gate leaf 1.

Since the platform 2 and the gate leaf 1 are of a width less than the width of the downstream channel, they are provided with sides 29, the lower edge of which is in alignment with the lower edge of the gate leaf 1 and the hinge 0 and the upper edge of which extends substantially horizontally from the upper edge of the gate leaf. The upstream portion of the platform 2 is provided with a substantially vertical wall 30 on the upper surface thereof which cooperates with the side walls 29 and the upper portion of the gate leaf 1 to provide a reservoir 31 in which an auxiliary body of water is maintained for producing a constant pressure on the upper surface of the platform 2.

It will be noted that the wall 30 is lower than the other walls of the reservoir 31 and provides a weir or spillway 32 for the discharge of water from the reservoir whereby the level therein may be maintained substantially constant. Water is supplied to the reservoir 31 from the upstream reach through an opening 33 in the platform 2.

Since the level of water in the reservoir 31 is constant, the pressure exerted thereby on the upper surface of the platform 2 will be substantially constant. The pressure on the under surface of this platform, however, will vary in accordance with the variation in level of the upstream reach. Therefore, if the level of the upstream reach increases, the force tending to raise the platform 2 and the gate leaf 1 will be increased so that the latter will be raised to permit a greater discharge of water through the opening 28. On the other hand, however, if the level of the upstream reach drops, the pressure exerted on the under surface of the platform 2 will decrease and the gate leaf will be allowed to move downwardly to decrease the discharge through the opening 28, which will effect an increase in the level of the upstream reach.

An advantageous feature of this form of the invention resides in the fact that when the level of the upstream reach drops below that of the downstream reach, the gate leaf will move to a position to close the opening 28 so that there will be no flow from the downstream reach to the upstream reach. Thus, this form of the invention is particularly useful at a point where an irrigation system discharges into salt water.

The upper portion of the gate leaf above the platform may have a form other than that of a cylindrical sector to compensate for errors. It is also possible to compensate for errors by placing a body 45 of special shape in the container. The shape of this body will, of course, vary with the result to be obtained.

Figure 2:
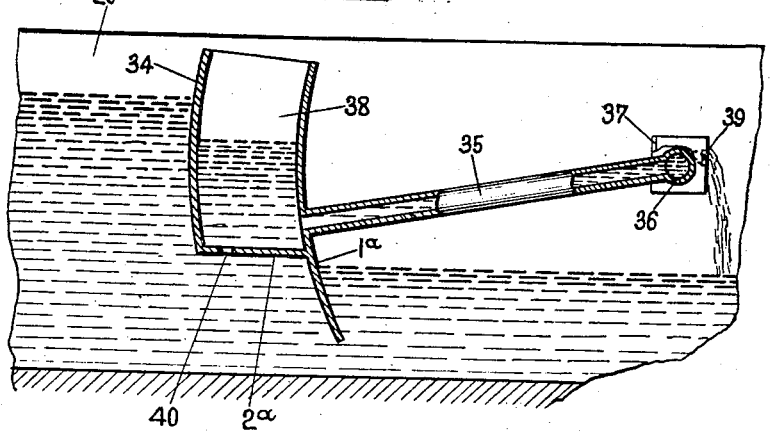
Fig. 2 is a view similar to Fig. 1, showing a modified form of gate for insuring the maintenance of a constant upstream level.
Figure 3:
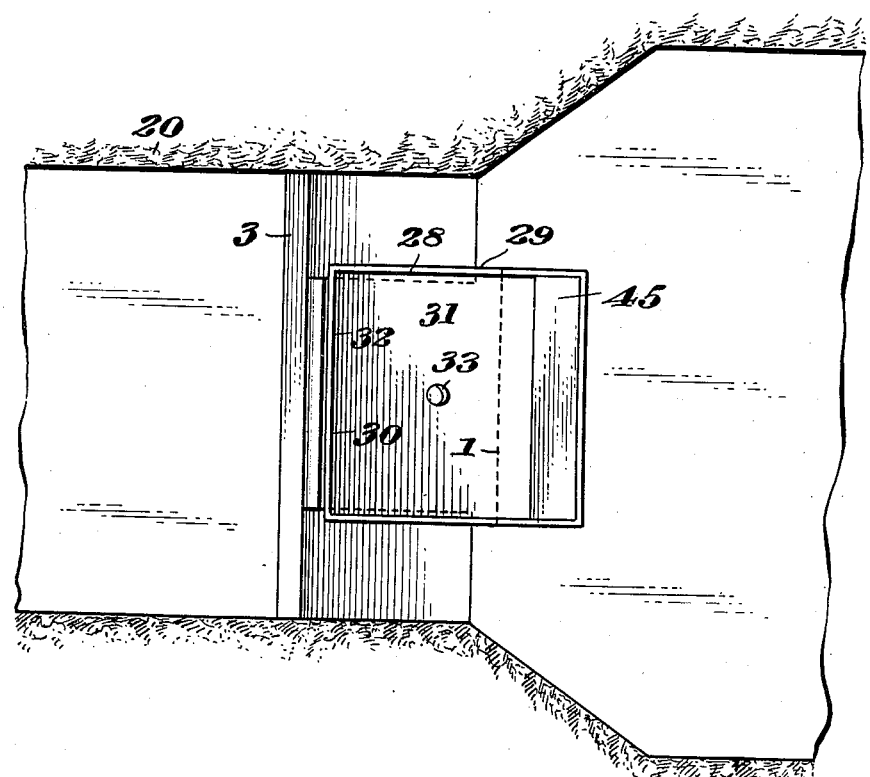
Fig. 3 is a diagrammatic plan view of the structure shown in Fig. 1.

A further embodiment of the present invention is shown in Fig. 2 of the drawings, in which the use of a fixed wall or partition for separating the upstream reach from the downstream reach is eliminated. In this figure, a substantially horizontal platform 2a is provided which extends across the channel between the side walls thereof. A movable dam 34, extending across the channel between the side walls thereof, is carried by the upstream end of the platform 2a. A gate leaf 1a is carried by the downstream end of the platform 2a and extends both upwardly and downwardly from said platform. The assembly of the platform, gate leaf and dam is carried by hollow arms 35, which communicate with a tubular conduit 36 extending across the downstream reach of the channel and which is rotatably mounted in and communicates with bearing-like containers 37. At this point, it should be noted that the gate leaf 1a and the dam 34 are constructed as sectors of cylinders, the axes of which coincide with the axis of the conduit 36. By constructing these members as cylindrical sectors, the resultant of the hydraulic forces acting thereon passes through the axis of the conduit 36 and therefore does not tend to raise or lower the gate, consisting of the platform 2a, the gate leaf 1a and the dam 34.

The form of invention shown in Fig. 2 is designed to maintain a constant upstream level and therefore means are provided for maintaining a constant pressure on the upper surface of the platform 2a. For this purpose, a reservoir 38 is provided on the upper side of the platform 2a between the dam 34 and the upper portion of the gate leaf 1a. This reservoir communicates through the hollow arms 35 and the conduit 36 with the container 37. The container 37 is open and is provided with a weir 39. The platform 2a is provided with an opening 40 through which water from the upstream reach passes into the reservoir 38. As the level of the water in the reservoir 38 rises, it flows through arms 35 and conduit 36 into the container 37 and is discharged therefrom over the weir 39. This operation maintains the level of the water in the reservoir 38 constant and therefore the pressure exerted on the upper surface of the platform 2a is constant. The pressure exerted on the under surface of the platform 2a depends upon the level of the upstream reach and consequently when said level increases the pressure on the under surface of said platform tends to raise the same which, in turn, raises the gate leaf 1a which permits a greater discharge from the upstream to the downstream reach. On the other hand, however, when the upstream level decreases, the pressure exerted on the under surface of the platform 2a decreases and the gate leaf 1a is lowered to reduce the discharge.

The embodiment of the present invention shown in Fig. 2 serves to maintain the level of the upstream reach constant until the level of the downstream reach becomes equal to the level of the water in the reservoir 38 and in the containers 37. As the level of the downstream reach rises above the level in the reservoir 38 and the container 37, or in other words, rises above the weir 39, the apparatus functions to maintain a constant difference between the levels of the upstream and downstream reaches. This operation is effected by reason of the level in the reservoir 38 rising above the crest of the weir 39 and assuming a level equal to the level of the downstream reach. When this takes place, the gate operates in the same manner as that shown in Fig. 1. In other words, the force tending to raise and lower the gate will then correspond to the difference in level between the upstream and downstream reaches. Therefore, as the difference between the levels of the upstream and downstream reaches increases, the gate leaf 1a will be lowered, and as the difference between the levels of the upstream and downstream reaches decreases, the gate leaf will be raised.

This form of the present invention is of importance for installations at a point where the waste from an irrigation system is discharged back to a river, the constant upstream level being useful for feeding laterals upstream. On the other hand, when the level of the river tends to rise above the usual level of the upstream reach, the upstream level is increased to prevent a flow from the river to the upstream reach. Thus, in the case of discharge into salt water, none of the latter will be introduced into the irrigation system.

In both of the arrangements described, it is sufficient for modifying the adjustment of the gate, to vary the weight thereof.

Further, in the devices provided with a weir, the adjustment may also be modified by varying the level of the crest of the said weir.

It may also be mentioned that, contrary to what is the case in existing apparatus adapted for the same purpose, the verification, the maintenance and the cleaning of the movable assembly may be effected without difficulty and without dismantling being necessary. It suffices to raise the platform to the vertical so as to enable its lower face to be reached.

The forms of construction above described show that the device of the present invention lends itself, by means of suitable constructional modifications, to very diverse applications, which all remain within the essential scope of the invention.

While I have shown and described the preferred embodiment of my invention, I wish it to be understood that I do not confine myself to the precise details herein set forth by way of illustration, as it is apparent that many changes and variations may be made therein by those skilled in the art, without departing from the spirit of the invention or exceeding the scope of the appended claims.

I claim:

1. In a water system, an open channel for the flow of a stream of water, said channel discharging into a wider body of water of a level lower than that of said stream, a dam at the end of said channel, said dam having an opening in its lower portion beneath the level of said stream, a closure for said opening comprising a substantially horizontal platform hinged to said dam at the upper edge of the opening, a gate leaf carrier by the free end of said platform and extending upwardly and downwardly therefrom, side walls extending from the gate leaf to the hinged end of said closure to provide a reservoir on the upper side of said platform, and means for maintaining a constant level of water in said reservoir to maintain a constant level of water in said channel.

2. In a water system, means including an open channel for the flow of a stream of water, an automatic gate extending across said channel and separating an upstream reach of said stream from a downstream reach thereof, said gate comprising a substantially horizontal platform, a dam secured to the upstream end of said platform and extending upwardly therefrom, a gate leaf secured to the downstream end of said platform and extending upwardly and downwardly therefrom, the upper portion of said gate leaf cooperating with said dam and platform to form a reservoir, means for supporting said dam, platform and gate leaf for substantially vertical movement about a horizontal axis, said dam and gate leaf being in the form of sectors of cylinders the axes of which coincide with said horizontal axis, and means for maintaining a constant level of water in said reservoir.

3. In a water system, means including an open channel for the flow of a stream of water, an automatic gate extending across said channel and separating an upstream reach of said stream from a downstream reach thereof, said gate comprising a substantially horizontal platform, a dam secured to the upstream end of said platform and extending upwardly therefrom, a gate leaf secured to the downstream end of said platform and extending upwardly and downwardly therefrom, the upper portion of said gate leaf cooperating with said dam and platform to form a reservoir, means for supporting said dam, platform and gate leaf for substantially vertical movement about a horizontal axis, said dam and gate leaf being in the form of sectors of cylinders the axes of which coincide with said horizontal axis, said supporting means including a hollow arm comunicating with said reservoir, and a weir box located at said axis and communicating through said hollow arm with said reservoir for maintaining a constant level in said reservoir.

4. In a water system, an open channel for the flow of a stream of water, said channel discharging into a wider body of water of a level lower than that of said stream, a dam at the end of said channel, said dam having an opening in its lower portion beneath the level of said stream, a closure for said opening comprising a substantially horizontal platform hinged to said dam at the upper edge of the opening, a gate leaf carried by the free end of said platform and extending downwardly therefrom, side walls extending from the gate leaf to the hinged end of said closure and adapted to cooperate with said gate leaf to surround the opening in said dam, and means for exerting a constant downward closing action on said closure.

5. In a water system, an open channel for the flow of a stream of water, said channel discharging into a wider body of water of a level lower than that of said stream, a dam at the end of said channel, said dam having an opening in its lower portion beneath the level of said stream, a closure for said opening comprising a substantially horizontal platform hinged to said dam at the upper edge of the opening, a gate leaf carried by the free end of said platform and extending downwardly therefrom, side walls extending from the gate leaf to the hinged end of said closure and adapted to cooperate with said gate leaf to surround the opening in said dam, and means for exerting a constant downward closing action on said closure, said gate leaf being in the form of a sector of a cylinder the axis of which coincides with the axis of the hinge of said platform.

6. In a water system, an open channel for the flow of a stream of water, said channel discharging into a wider body of water of a level lower than that of said stream, a dam at the end of said channel, said dam having an opening in its lower portion beneath the level of said stream, a closure for said opening comprising a substantially horizontal platform hinged to said dam at the upper edge of the opening, a gate leaf carried by the free end of said platform and extending downwardly therefrom, side walls extending from the gate leaf to the hinged end of said closure and adapted to cooperate with said gate leaf to surround the opening in said dam, and means for maintaining a constant hydraulic load on the upper side of said platform.

7. In a water system, an open channel for the flow of a stream of water, said channel discharging into a wider body of water of a level lower than that of said stream, a dam at the end of said channel, said dam having an opening in its lower portion beneath the level of said stream, a closure for said opening comprising a substantially horizontal platform hinged to said dam at the upper edge of the opening, a gate leaf carried by the free end of said platform and extending downwardly therefrom, side walls extending from the gate leaf to the hinged end of said closure and adapted to cooperate with said gate leaf to surround the opening in said dam, and means for maintaining a constant hydraulic load on the upper side of said platform, said gate leaf being in the form of a sector of a cylinder the axis of which coincides with the axis of the hinge of said platform.

8. In a hydraulic system, an open channel for the flow of a stream of water, an automatic gate extending transversely across said channel and separating the upstream and downstream reaches of the stream, said gate comprising a platform mounted for oscillation about a horizontal axis extending transversely of the channel, a gate leaf in the form of a cylindrical segment fixed to the platform and having its axial center coinciding with the horizontal axis about which the platform oscillates, said gate leaf extending above and below the platform and forming a variable orifice with the bottom of the channel, a reservoir on the upper side of the platform the bottom of which is formed by the platform, said platform having an opening therein for the feed of water to said reservoir from the upstream reach, and means for maintaining a constant level in said reservoir in order to maintain a constant level in the upstream reach of the channel.

9. In a hydraulic system, an open channel for the flow of a stream of water, an automatic gate extending transversely across said channel and separating the upstream and downstream reaches of the stream, said gate comprising a platform mounted for oscillation about a horizontal axis extending transversely of the channel, a gate leaf in the form of a cylindrical segment fixed to the platform and having its axial center coinciding with the horizontal axis about which the platform oscillates, said gate leaf extending above and below the platform and forming a variable orifice with the bottom of the channel, a reservoir on the upper side of the platform the bottom of which is formed by the platform, said platform having an opening therein for the feed of water to said reservoir from the upstream reach, and a spillway discharging into the downstream reach of the channel immediately adjacent the axis of oscillation of the platform.

PIERRE FRANÇOIS DANEL.